United States Patent [19]

Bates, II

[11] 4,073,167

[45] Feb. 14, 1978

[54] MECHANISM FOR CONVERTING PREDETERMINED ALTERNATE ROTATIONAL MOVEMENTS TO RECTILINEAR MOVEMENTS

[76] Inventor: Charles F. Bates, II, 18 St. Andrews Drive, Ladue, Mo. 63124

[21] Appl. No.: 659,499

[22] Filed: Feb. 19, 1976

[51] Int. Cl.[2] .......................... E05B 37/00; E05B 37/20; F16H 25/12

[52] U.S. Cl. .......................................... 70/133; 70/284; 70/290; 74/57; 74/89

[58] Field of Search .................. 70/133, 284, 285, 286, 70/289, 290, 313, 443, 449, 451; 292/140, 155, 176; 74/57, 59, 89

[56] References Cited

U.S. PATENT DOCUMENTS

| | | | |
|---|---|---|---|
| 420,298 | 1/1890 | Gminder | 292/155 |
| 536,831 | 4/1895 | Hill | 70/290 |
| 785,132 | 3/1905 | Vieweg | 70/290 X |
| 915,199 | 3/1909 | Martin | 70/289 |
| 1,086,551 | 2/1914 | Mosher | 70/289 X |
| 1,144,289 | 6/1915 | Blair et al. | 292/140 |
| 1,327,601 | 1/1920 | Ludlow | 70/289 |
| 1,402,017 | 1/1922 | Russell | 292/155 |
| 2,441,864 | 5/1948 | Bauer | 70/286 X |
| 2,554,165 | 5/1951 | Young | 70/290 X |
| 3,287,944 | 11/1966 | Crumb | 70/451 X |
| 3,312,090 | 4/1967 | Petersen | 70/285 |
| 3,316,742 | 5/1967 | Wellekens | 70/451 |

FOREIGN PATENT DOCUMENTS

| | | | |
|---|---|---|---|
| 654,142 | 6/1936 | Germany | 292/155 |
| 371,899 | 5/1932 | United Kingdom | 292/155 |

*Primary Examiner*—Roy D. Frazier
*Assistant Examiner*—Thomas J. Holko
*Attorney, Agent, or Firm*—F. Travers Burgess

[57] ABSTRACT

A mechanism for converting predetermined alternating rotational movements to rectilinear movements is embodied in a combination lock having a casing with an elongated recess, a bolt slidably mounted in the casing for axial movement between a retracted unlocked position and a projected locking position, the bolt being non-rotatable in the casing and having an axial cylindrical recess, a cylindrical cam rotatably mounted in the bolt recess and held against axial movement relative to the casing; the cam is formed with grooves in its cylindrical surface inclined in opposite directions lengthwise of the cam and intersecting each other at predetermined positions angularly disposed about the axis of the cam; the bolt mounts an inwardly projecting follower slidably fitting into the cam grooves and means are provided for manually rotating the cam alternately in opposite directions in accordance with the intersections of the grooves to cause the follower to move the bolt axially in the casing.

39 Claims, 19 Drawing Figures

MECHANISM FOR CONVERTING PREDETERMINED ALTERNATE ROTATIONAL MOVEMENTS TO RECTILINEAR MOVEMENTS

BACKGROUND OF THE INVENTION

1. Field of the Invention

The invention relates to mechanism for converting predetermined alternating rotational movements to rectilinear movements and more particularly to combination locks utilizing a grooved cylindrical cam as the combination element.

2. The Prior Art

Many combination locks use tumblers as the combination setting means. A principal disadvantage of such locks is that when the dial of the lock is turned, there is a clicking noise when the various tumblers are moved which might be sufficient to enable an experienced person to determine the combination merely by turning the dial and listening.

Other combination locks have been proposed including grooved cylindrical cams alternately rotatable by setting a combination on a dial to unlatch the bolt which is manually retracted and manually projected into locking position at the same time recocking the combination mechanism cam and follower. Such an arrangement is disclosed in G. W. Hill U.S. Pat. No. 536,831. In G. C. Martin U.S. Pat. No. 915,199 the unlocking cam consists of a cylindrical member having groups of alternately reversing threads and a second threaded shaft, unidirectionally threaded, is provided for returning the mechanism to lock position. As in the Hill patent, M. A. Mosher U.S. Pat. No. 1,086,551 utilizes a lever type follower to release the bolt and the valve controlled by the bolt is manually rotated by a crank between its opened and closed positions. In E. M. Young Pat. No. 2,554,165 the combination mechanism comprises a group of stacked spaced discs with veins cut into their peripheries in opposite directions to permit the passage of the discs by some cam abutment, whereby the operating member acts on a portion of the bolt to retract it, projection of the bolt being effected by a spring when the operating member is rotated in the opposite direction.

SUMMARY OF THE INVENTION

The invention provides means for converting predetermined alternating rotational movements to rectilinear movements. More particularly it provides a compact simplified combination lock of the cylindrical cam type having a minimum of moving parts.

The invention also provides a combination lock of the cylindrical cam type in which the cam is rotatably received within the sliding bolt itself and the cam follower is mounted on the bolt to effect axial movement of the bolt between unlocked and locked position simply by rotation of the cam within the bolt.

It further provides a lock of this type in which movement of the bolt to locking position is achieved solely by the rotation of the cam unidirectionally without the provision or operation of any additional knobs, springs or other elements.

It also provides a lock in which a movement in the wrong direction at a combination point will tend to return the bolt to the locked position.

The entire mechanism is contained in a small cylindrical casing which may be mounted in a door to other suitable location simply by drilling a hole of the proper diameter to receive it and a transverse hole for the knob shaft. The knob shaft is readily removable so as to permit the unobstrusive application to ornamental furniture, such as cabinets, in which a knob would be aesthetically unsuitable.

Because of its compact size and construction and cylindrical shape it can be readily combined with key type locks and is readily adaptable to an infinite variety of uses where compactness, simplicity, dependability and versatility are essential or desirable.

Among its many advantages over most conventional combination locks is the elimination of the possibility of unauthorized persons learning the combination by listening to the clicking of the tumblers.

DETAILED DESCRIPTION OF THE INVENTION

Figure 1:
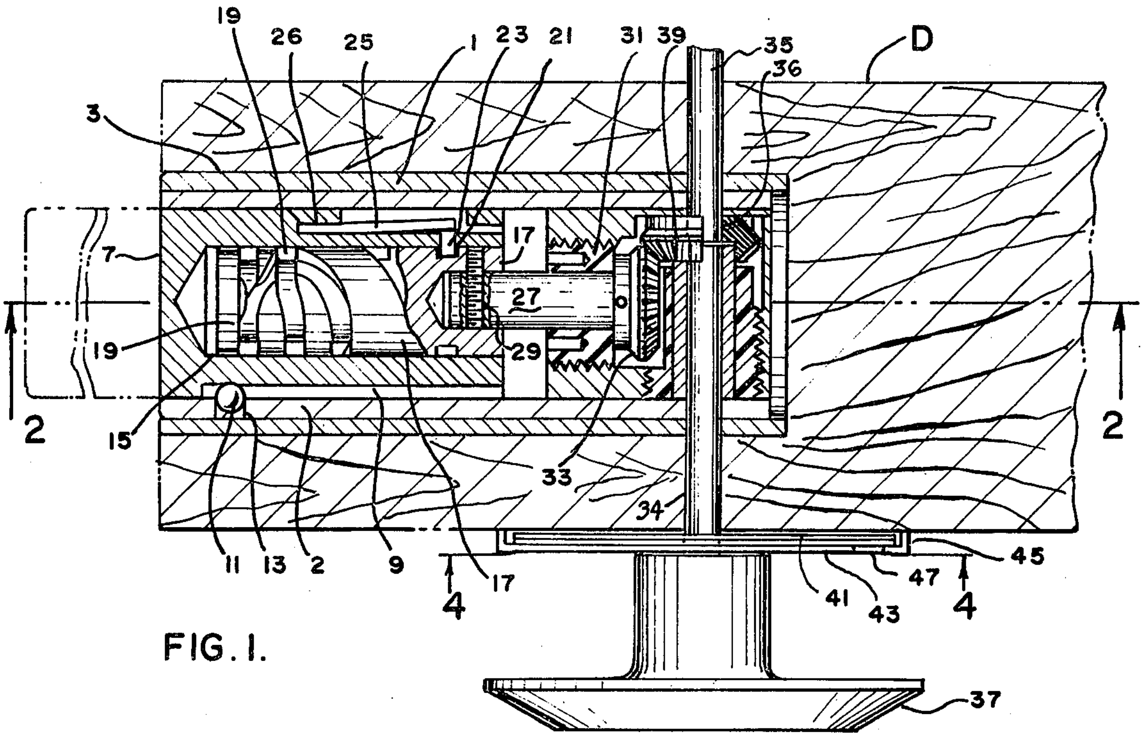
FIG. 1 is a horizontal diametral sectional view taken along line 1—1 of FIG. 2 showing the lock mounted in a wooden door.
Figure 2:
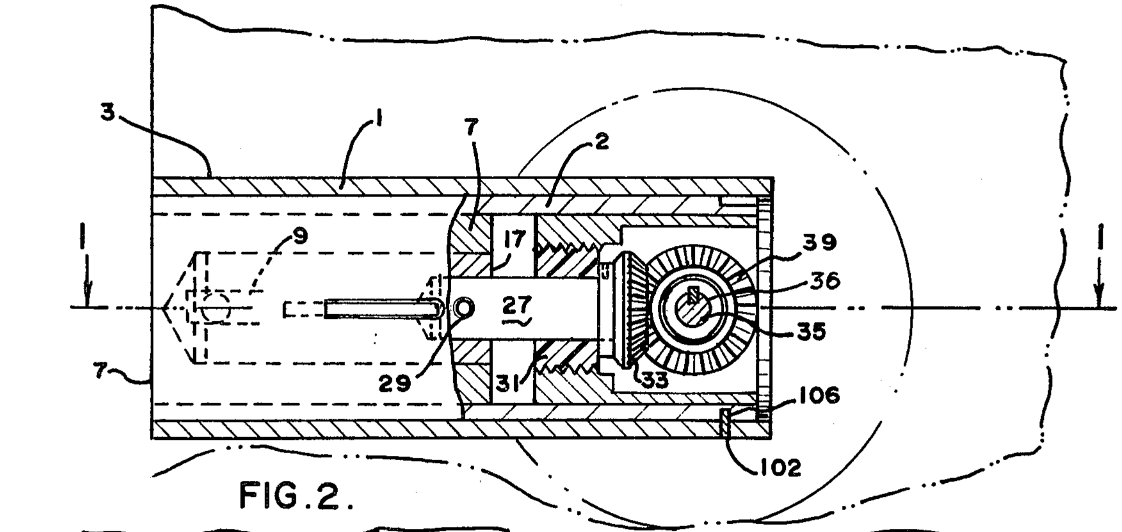
FIG. 2 is a vertical diametral sectional view taken along line 2—2 of FIG. 1.
Figure 3:
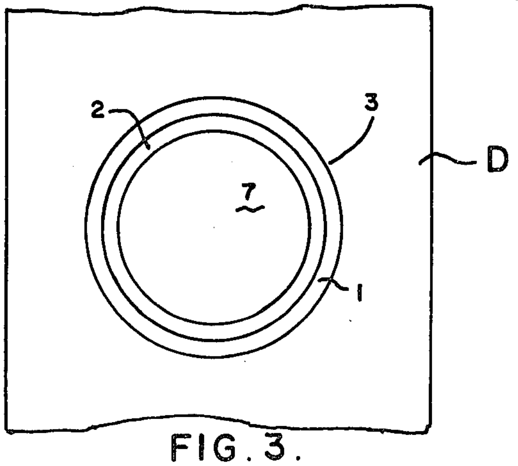
FIG. 3 is an outer end view of the lock illustrated in FIGS. 1 and 2.
Figure 4:
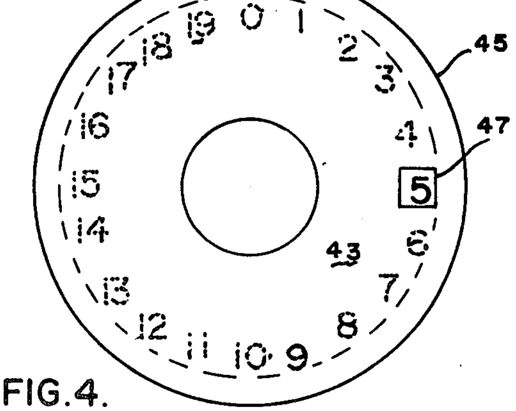
FIG. 4 is a view taken along line 4—4 of FIG. 1 showing the apertured knob plate.

The lock comprises a cylindrical casing 1 which preferably includes a fixed cylindrical liner 2 and is fixedly received in a cylindrical bore 3 in a door D. Within liner 2 a cylindrical bolt 7 is slidably received for axial movement therein only. For retaining bolt 7 against rotational movement in liner 2 the bolt may be formed with an axial groove 9 in its outer surface and a ball 11 may be seated in a suitable hole 13 in liner 2 to project into groove 9 and thereby prevent rotation of bolt 7 while facilitating its translation or axial movement within casing liner 2.

For causing axial movement of bolt 7 between the unlocked position shown in solid lines in FIG. 1 and the projected locking position shown in broken lines, bolt 7 is formed with an internal axial cylindrical recess 15 and a cylindrical cam 17 is rotatably received in bolt recess 15. Cam 17 is held against axial movement in liner 2 and the bolt is axially slidable with respect to the cam. Cam 17 is formed with a groove system 19 comprising a number of grooves intersecting each other and extending in opposite directions such that alternate rotation of cam 17 in opposite directions in accordance with the intersections of the grooves will cause bolt 7 to be retracted from the projected locking position shown in broken lines in FIG. 1.

To cause axial movement of the bolt responsive to rotation of cam 17, bolt 7 is formed with a radial hole 21 near its inner end and a short pin-like follower 23 projects inwardly through hole 21 into groove system 19. A spring 25 retained at one end in a slot 26 in bolt 7 bears against the outer end of follower pin 23 to bias the latter into sliding engagement with the inner surfaces of cam groove system 19. From the foregoing it will be evident that as cam 17 is rotated, since bolt 7 is non-rotatable but is translatable and since cam 17 is held against translation in liner 2, rotation of cam 17 will cause follower pin 23 to follow groove system 19 and cause corresponding translatory movement of bolt 7 in liner 2. For rotating cam 17 so as to operate bolt 7, a right angle drive mechanism comprising a shaft 27 secured to cam 17 by set screw 29 and extending rearwardly therefrom through a bearing 31, mounts, at its rear end, bevel gear 33. Operating shaft 35 passes through a bore 34 in the door at right angles to the axis of casing 1, 2 and mounts at at least one end operating knob 37. Shaft 35 removably passes through the rear end of casing 1, 2 and through an aperture 36 in a bevel gear 39 so constructed as to permit entering of shaft 35 in a single rotational position, whereby relative rotation of the shaft will rotate the cam in accordance with the combination. Bevel gear 39 is in meshing engagement with gear 33 so that rotation of knob 37 is transmitted through shaft 35, gears 39 and 33 and shaft 27 to cam 17, where, through the cooperation of cam groove system 19 and bolt follower pin 23, it causes axial translatory movements of bolt 7 in liner 2. To aid the operator of the lock in setting the combination, operating shaft 35 may mount a disc 41 outwardly of the outer surface of the door, adjacent the periphery of which are inscribed, at equiangular intervals, numerals from 0–19, and a cover plate 43, formed with a peripheral flange 45 to provide a housing for combination disc 41, may be secured to the outer surface of the door at a suitable location, in registry with the numerals described on disc 41. Plate 43 is formed with a window 47 adapted to display a single numeral. On ornamental furniture and the like, a dial may be omitted, and the combination may be set by rotation of an aesthetically suitable knob or handle with reference to an imaginary clock face.

Shaft 35 may be entirely removed from transverse bore 34 if desired for aesthetic reasons and also in the interest of secrecy. If desired the cover plate surrounding bore 34 may also be eliminated for aesthetic or security reasons.

Referring to FIGS. 5 and 8–15, near its outer end cam 17 has an annular groove 51 which, for purpose of clarity, is lined to represent the color red. The cam follower 23 rides in groove 51 while the bolt 7 is in its fully projected position. For retracting the bolt from the fully projected locking position by rotation of cam 17, a first oblique groove 53, lined for purple, extends parallel to and partly overlaps annular groove 51 between section lines 11—11 and 13—13 and extends in a counterclockwise direction from section line 11—11 at a small acute angle not greater than 25° and preferably between 20° and 25°. At the intersection the floor of oblique groove 53 is lower than that of annular groove 51, forming a vertical drop-off at 52 to facilitate passage of the follower from groove 51 into the merging portion of groove 53 when the cam is rotated counterclockwise and preventing passage of the follower into groove 51 if the cam is properly reversed while the follower is in the overlapping portion of groove 53 between drop-off 52 and section line 13—13. Clockwise from drop-off 52 a raised abutment 57 is formed on the floor of groove 51 and has an oblique vertical surface 59 and an annular vertical surface 61 adapted to engage the follower 23 as the cam is rotated counterclockwise (to the left) and thereby guide the follower to a drop-off at 52 where the floor of groove 53 is lower than that of groove 51, which becomes a combination point requiring an immediate reversal and clockwise rotation of the cam (to the right) to cause the follower to move in oblique groove 53 toward drop-off 65.

Figure 5:
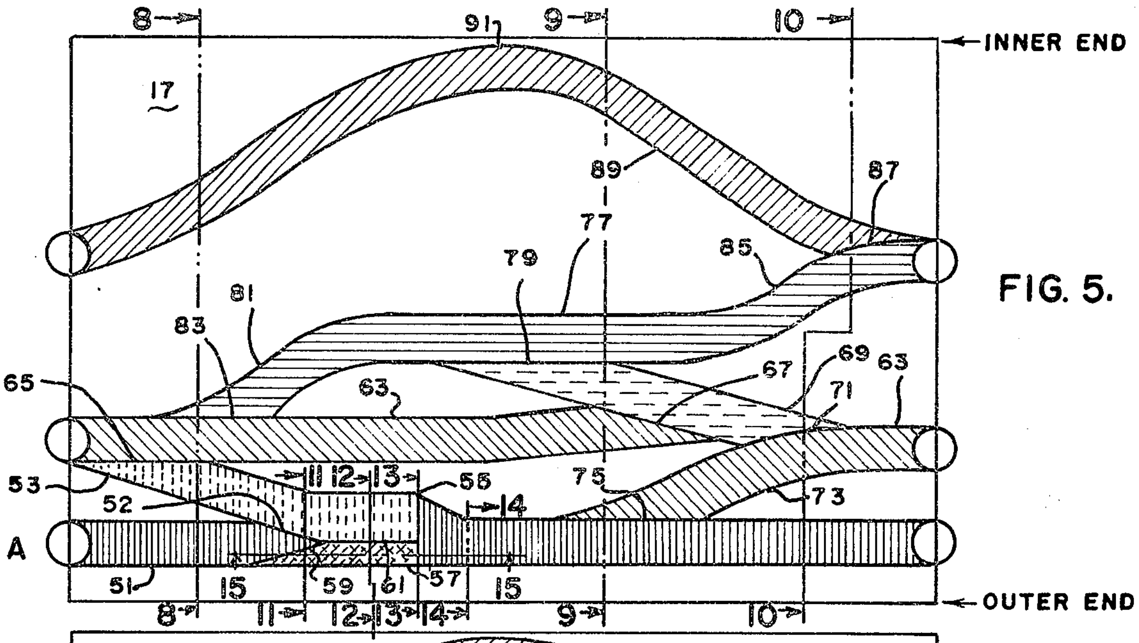
FIGS. 5, 6 and 7 are orthographic projections of typical cam groove arrangements.

At its right hand end at line 13—13, as viewed in FIG. 5, the top surface of abutment 57 and the floor of groove 53 are at the same depth and groove 53 is at its full width such that if a person unfamiliar with the combination continues to rotate the cam in a counterclockwise direction (to the left) the follower will be guided toward intersection 52 directed by oblique vertical surface 59 and when past the combination point the follower freely passes that point at section line 13—13, where groove 53 is as wide as the follower, and will be caused to re-enter groove 51 guided by that oblique portion of groove 51 commencing at point 55, between section lines 13—13 and 14—14 so that continued counterclockwise rotation of the cam produces only minor movement of the bolt as the follower cycles annular groove 51.

Conversely, when the cam is rotated in a continued clockwise direction (to the right) the follower upon reaching section line 13—13 will by inertia continue its straight course, travelling up abutment 57, whose top surface is entirely below the outer surface of the cam, dropping from abutment 57 into groove 51 at oblique vertical surface 59 so that continued rotation of the cam in a clockwise direction (to the right) will maintain the follower positioned in groove 51 and produce no retraction of the bolt.

Parallel to first annular groove 51, a second annular groove 63, lined for green, intersects oblique groove 53 at a similarly acute angle at a drop-off 65, the floor of annular groove 63 at the intersection with groove 53 being slightly deeper than the adjacent portion of groove 53, such that the follower could pass from groove 53 into groove 63 but could not pass from groove 63 into groove 53. By reversing direction of rotation of the cam when the follower enters the intersection of groove 63 from groove 53, which accordingly is a combination point, the follower will be caused to continue to the right in groove 63 as viewed in FIG. 5 to a similarly acute angle intersection drop-off 67 with a second oblique groove 69, lined for the color grey, which extends toward the inner end of the cam in a counterclockwise direction, the forward end of which intersects, at drop-off 71, on an acute angle an oblique end portion 73 of annular groove 63, which, in turn, extends in a counterclockwise direction toward the outer end of the cam and intersects first annular groove 51 at 75. At intersection drop-off 67, the floor of annular groove 63 is slightly higher than the floor of oblique groove 69, and at intersection drop-off 71 the floor of oblique groove 69 is slightly higher than the floor of oblique end portion 73 of annular groove 63, and at intersection drop-off 75 the floor of oblique end portion 73 is slightly higher than the floor of first annular groove 51. It will thus be seen that if rotational direction of the cam is not reversed at intersection 65 between oblique groove 53 and annular groove 63, the follower will continue in annular groove 63 and through oblique end portion 73 into first annular groove 51, in which position it will have returned bolt 7 to its fully projected position and continued rotation in a clockwise direction will cause the follower to ride continuously in first annular groove 51 and cause no retraction of the bolt. If, on the other hand, direction were reversed when the follower passed drop-off 65, and the bolt were rotated in a counterclockwise direction, the follower would move in annular groove 63, passing drop-off 67 and then dropping into oblique groove 69, at which point direction should be again reversed to clockwise. If direction were not reversed at this point, continued counterclockwise rotation of the cam would cause the follower to pass from annular groove 63 into the forward end of groove 69 and thence past drop-off 71 back down into annular groove 63 and continued rotation in a counterclockwise direction would cause the follower simply to remain in second annular groove 63, thus causing no substantial further retraction of the bolt. In the event that rotation of the cam is reversed to the clockwise direction at any point after drop-off 71 or before drop-off 67, the follower will pass through oblique portion 73 and via drop-off 75 into first annular groove 51, where it will remain as long as clockwise rotation continues.

Oblique groove 69 intersects at its inner end, via a drop-off 79, a third partly annular groove 77, lined for the color blue, the floor of groove 77 at drop-off 79 being slightly lower than the adjacent portion of the floor of groove 69 to prevent the follower from passing from groove 77 into groove 69.

In a counterclockwise direction from intersection 79, groove 77 has an oblique portion 81, which extends outwardly in a counterclockwise direction to intersect second annular groove 63 at drop-off 83, the floor of groove portion 81 being higher than that of groove 63 at the drop-off 83 to prevent the follower from passing from groove 63 into groove portion 81.

In a clockwise direction from intersection drop-off 79 with oblique groove 69, third partly annular groove 77 extends obliquely inwardly of the cam in a clockwise direction at 85 to an intersection drop-off 87 with a sinusoidal groove 89, lined for brown, which extends obliquely therefrom in both directions to a point 91 adjacent the inner end of the cam 17, the floor of groove portion 85 at drop-off 87 being lower than that of the portion of groove 89 which extends counterclockwise from the intersection.

Continuing with the rotation of the cam when follower 23 is in groove 69 adjacent drop-off 67, and the cam is rotated clockwise, follower 23 proceeds to drop-off 79 between oblique groove 69 and third partly annular groove 77 which provides a fourth combination point requiring reversal to a counterclockwise direction of cam 17 such that follower 23 will pass to the right (as seen in FIG. 5) in partly annular groove 77 and through oblique portion 85 thereof to intersection 87 with sinusoidal groove 89, at which point continued rotation in the same direction of cam 17 will cause the follower to move to the point 91, at which point the bolt 7 is fully retracted. If, instead of reversing direction when the follower passed drop-off 79 between oblique groove 69 and third partly annular groove 77, clockwise rotation of cam 17 had been continued, the follower would have continued to the left (as seen in FIG. 5) in annular groove 77 and through its oblique portion 81 and drop-off 83 into second annular groove 63 and thence, via its oblique end portion 73, into first annular groove 51, at which position bolt 7 would be in its fully projected position. If, after the bolt is fully retracted and the follower is at point 91 on sinusoidal groove 89, the person operating the lock continues rotation of the cam in the same direction, i.e., counterclockwise the bolt will be reciprocated unless the operator stops rotating when the follower reaches point 91. For returning the bolt to locked position, i.e., projecting it, cam 17 is rotated in a clockwise direction causing the follower to move along the left hand leg of groove 89 and thence past intersection drop-off 87 into oblique portion 85 of third partly annular groove 77 and thence via oblique end portion 81 of groove 77, through intersection 83, into second annular groove 63 and thence via oblique portion 73 of the latter, through intersection 75, into first annular groove 51, at which time bolt 7 will be positioned in its fully projected locking position.

Figure 6:
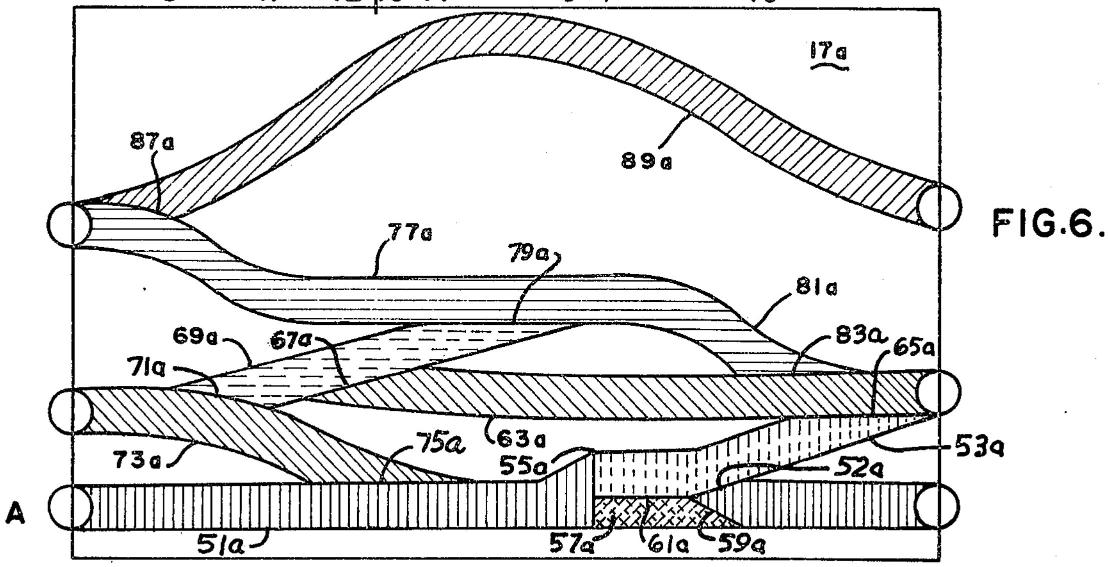

FIG. 6 illustrates a cam **17*a*, a mirror image of cam 17, having a modified groove arrangement which is a reversal in a rotational direction of the grooves of cam 17 and their related drop-off points, and operation would be identical except for a reversal of a rotational direction to accomplish desired translational movement of the bolt. The grooves in FIG. 6 bear the same numbers as the corresponding grooves in FIG. 5**, modified by the letter "*a*".

Figure 7:
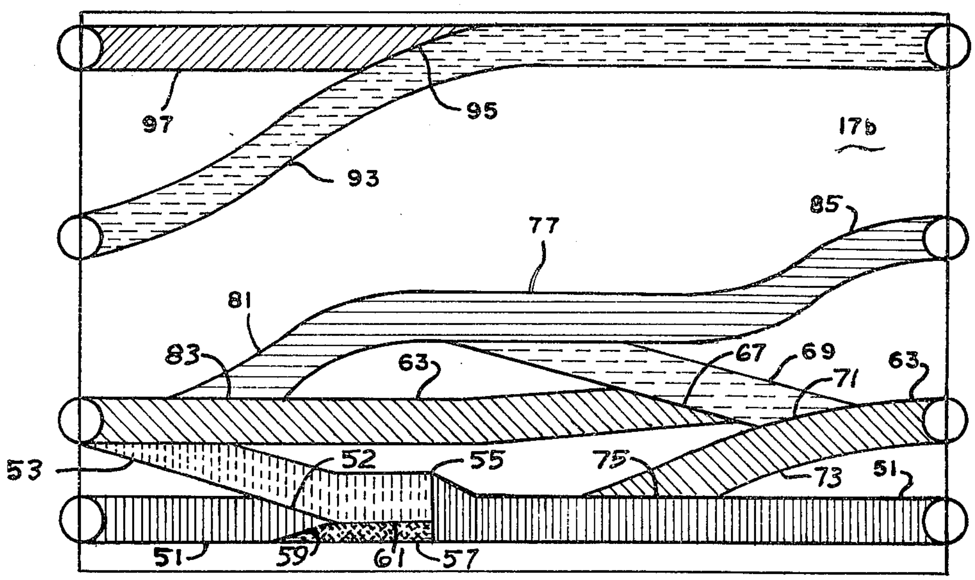
Figure 9:
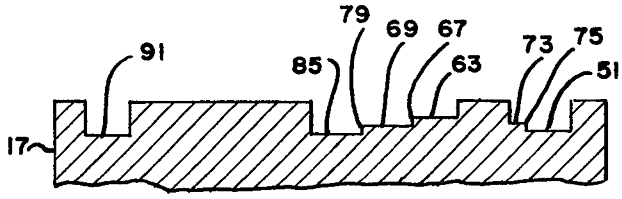
FIGS. 8–10 are respectively fragmentary diametral sectional views taken along lines 8—8, 9—9, and 10—10 of FIG. 5.
Figure 8:
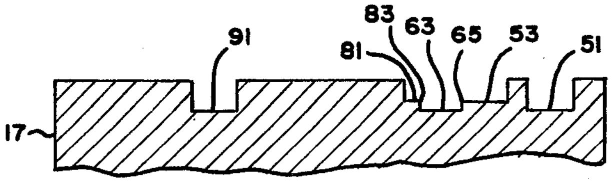
Figure 10:
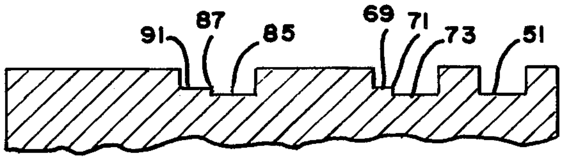
Figure 11:
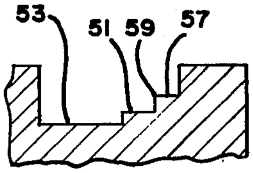
FIGS. 11–14 are enlarged fragmentary diametral sectional views taken along lines 11—11, 12—12, 13—13, and 14—14 of FIG. 5.
Figure 12:
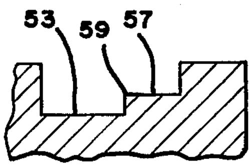
Figure 13:
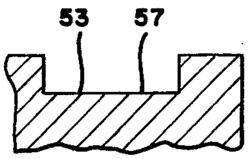
Figure 14:
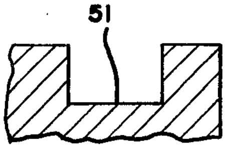
Figure 15:
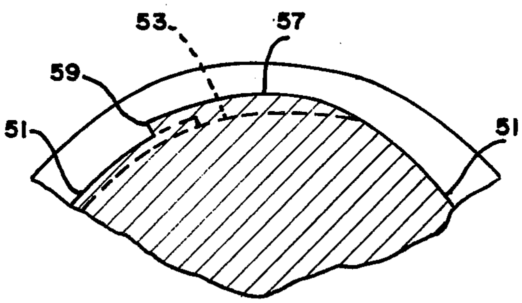
FIG. 15 is a fragmentary transverse sectional view taken along line 15—15 of FIG. 5.

FIG. 7 illustrates a cam **17*b* having a modified groove arrangement in which the first annular, first oblique, second annular, second oblique, and third partly annular grooves are similarly arranged to those of FIG. 5. This arrangement differs from that of FIG. 5 in that the sinusoidal groove 89 is replaced by an oblique groove 93 which intersects, at a drop-off 95, a fourth annular groove 97, the floor of groove 93 being lower than that of groove 97 at drop-off 95, such that continued rotation of the cam in a counterclockwise direction will cause follower 23 to move from the oblique end portion 85 of third annular groove 77 into oblique portion 93 of fourth annular groove 97 and remain in the fully retracted position by moving annularly in annular groove 97 as long as counterclockwise rotation of the cam continued. By reversing rotation of the cam, i.e., rotating it in a clockwise direction, follower 23 will move into engagement with drop-off 95 and the oblique portion 93 and thence into oblique portion 85 of third annular groove 77, from which it will be returned to the fully projected position as described above in connection with FIG. 5**.

By varying the rotational positions of intersections 52, 65, 67 and 79, and by adding annular and intersecting oblique grooves or by varying the turning ratio of shaft 35 to cam 17, an infinite variety of combinations can be achieved with any of the basic groove arrangements illustrated in FIGS. 5–7 and 8–15. By axially reversing the position of the cam on the bolt recess, the direction of bolt rotation can be reversed.

Operation of the lock illustrated in FIGS. 1–4 is as follows:

With bolt 7 projected into a keeper, not shown, on the door jam a person desiring to unlock the door will rotate knob 37 to cause the proper sequence of combination numbers to appear in window 47 in plate 43 and by so doing will cause follower 23, which is initially positioned in annular groove 51, to move into the overlapping portion of oblique groove 53 between section lines 11—11 and 12—12 at which point the operator will reverse the knob and rotate the cam such that follower 23 passes through oblique groove 53 into second annular groove 63 at intersection drop-off 65, whereupon cam rotational direction is again reversed and the follower moves through second annular groove 63 to second oblique groove 69 which it enters at intersection drop-off 67 and rotational direction of the cam is again reversed to cause follower 23 to move through second oblique groove 69 into third partly annular groove 77 via intersection 79, whereupon rotational direction is again reversed and the follower moves through third annular groove 77 and its oblique end portion 85 into sinusoidal groove 89 and continuing in the same rotational direction to the end point 91, at which point rotational movement is terminated and the bolt is fully retracted into the position shown in FIG. 1.

To return the bolt 7 to locked position from fully retracted position, the direction of rotation is reversed causing the follower to follow the left hand leg of sinusoidal groove 89 into the oblique portion 85 of third annular groove 77 and thence to the left hand oblique portion 81 of third annular groove 77 through intersection 83 into second annular groove 63 and through the latter and its oblique end portion 73 and intersection 75 into the first annular groove 51, which it will remain in, holding the bolt in locked position until the combination is again worked.

As an example of a lock in which the combination setting means is coaxial with the bolt, FIGS. 16–19 illustrate a lock in which a cylindrical casing 101 has, near its inner end, a transverse plate 102, the inner edge of which defines a chord of the cylinder. A cylindrical liner 103 has at its outer end an annular end wall 105 and its inner end is formed with a semi-annular groove 104 in its outer surface, one end of which is cut away at 106 along a chord tangent to the groove for registry with plate 102 to permit installation of the lock in the casing, the liner 103 being rotatable when groove 104 is aligned with plate 102 to seat the latter in the closed part of the groove and prevent withdrawal of the lock. In liner 103 is rotatably mounted the cylinder 107 of a tumbler lock mechanism having the usual cylindrical plug 109 in which are mounted a plurality of disc tumblers 111 which normally protrude from plug 109 into rectangular opening 108 in cylinder 107 and are retractable therefrom, in the usual manner, by inserting the proper key (not shown) in key slot 113 in plug 109. Tumbler lock cylinder 107 is formed with an L-shaped slot having an annular leg 110 and an axial long leg 112. Plug 109 mounts a radially projecting stud 114 which projects into terminal notch 118 in the blind end of slot leg 110 when the tumbler lock plug is in locked position and is movable in slot 110 by insertion and turning of the key in slot 113 to effect rotation of plug 109 and cause registry of stud 114 with slot 112. Stud 114 is then movable axially in slot 112 to permit rearward axial movement of plug 109 with respect to cylinder 107, the plug being biased outwardly by coil spring 116 in lock cylinder 107.

A bolt 115 is slidably mounted in liner 103 and is formed with a central axial cylindrical recess 117 of relatively small diameter widened at 119 to a sufficient diameter to slidably receive the inner end portion of lock cylinder 107 and to form an annular shoulder 121 spaced a short distance from the inner end 123 of lock cylinder 107 when the bolt 115 is fully retracted. A cylindrical cam 125 is rotatably received in cylindrical opening 117 in bolt 115, which is axially slidable with respect to cam 125. Cam 125 is connected by a link 127 to tumbler lock plug 109 so as to be held against axial movement with respect to the latter. Bolt 115 also mounts a follower 129 which is biased inwardly by a spring 131 into groove system 133 of cam 125. Bolt 115 is held against rotation by the reception in an axial groove 135 in the bolt outer surface of a ball 137 seated in a pocket 139 formed in liner 103, outward movement of the bolt to its locked position being limited by engagement of ball 137 with the inner end of groove 135.

Figure 16:
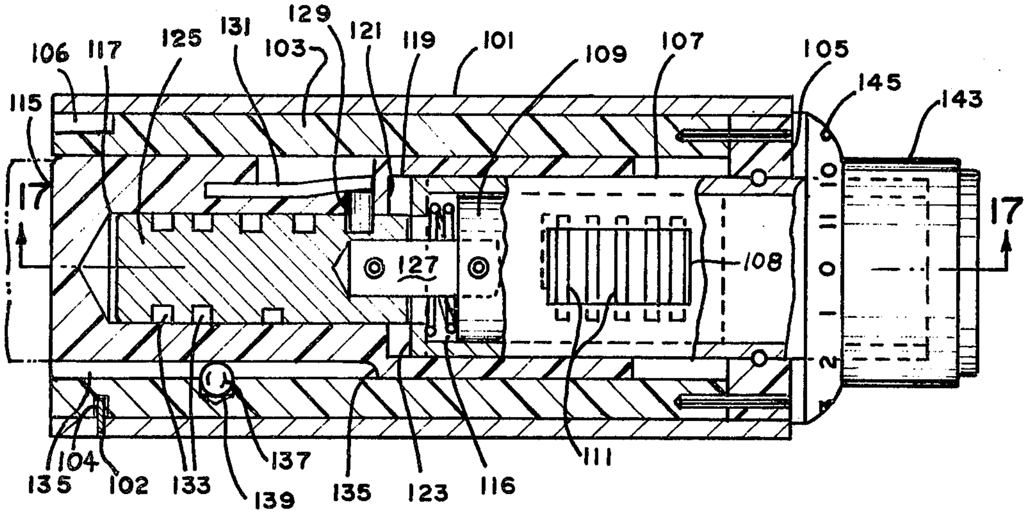
FIG. 16 is a horizontal diametral sectional view of a key operated lock incorporating the invention.
Figure 17:
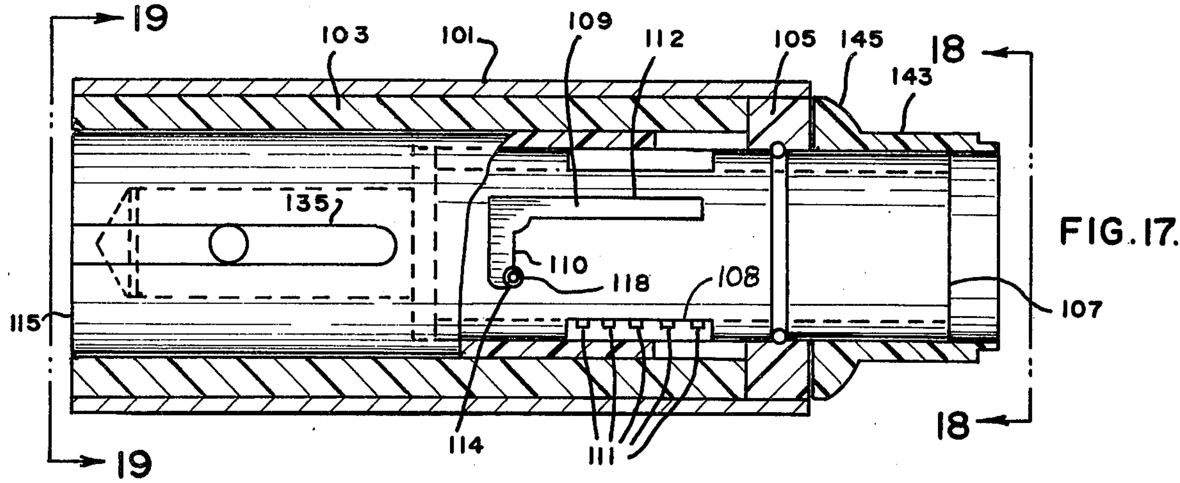
FIG. 17 is a vertical diametral sectional view taken along line 17—17 of FIG. 16.
Figure 18:
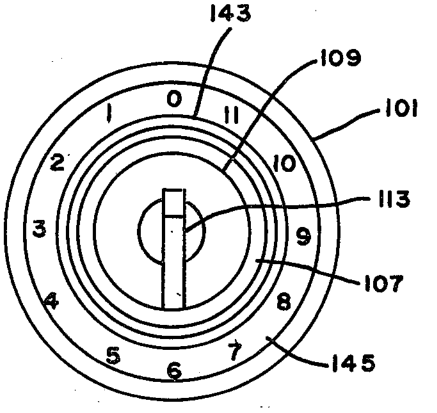
FIG. 18 is an end view taken along line 18—18 of FIG. 17.
Figure 19:
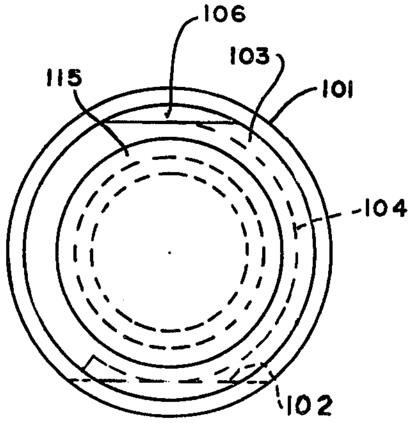
FIG. 19 is a rear end view taken along line 19—19 of FIG. 17.

The lock of FIGS. 16–19 can be opened by inserting the key into key slot 113 and turning it to the open position. When this is done, spring 116 pushes plug 109 and the key rearwardly which pulls cam 125, and with it bolt 115, rearwardly to retracted position. To open the lock without a key, the combination must be worked and for this purpose a fluted knob 143 is mounted on the protruding outer end of tumbler lock cylinder 107 and is provided with a peripheral numbered dial 145 so that by rotating fluted knob 143, cylinder 107 and the entire tumbler lock can be rotated together to cause, through link 127, corresponding rotation of cam 125, and by setting the proper combination with knob 143, bolt 115 can be retracted and held in retracted position, as shown in FIG. 16, by the engagement of follower 129 with the end portion 91 of groove 89 (FIG. 5). The lock can be returned to locked position by simply rotating the knob in the proper single direction continuously, or if the key has been used instead of the combination, by pushing the key inwardly until stud 114 is aligned with annular slot portion 110, at which point the bolt is fully projected, then turning the key counterclockwise until the stud reaches the end of annular slot 110, where it is seated in depression 118 by spring 116 and further locked in place by disc tumblers 111 protruding through opening 108 in cylinder 107.

It will be understood that the locks illustrated in the drawings and described herein are only illustrative embodiments of my invention and that mechanisms embodying my invention can be used for a variety of purposes, other than those of the illustrated and described locks, in which it is desirable to convert predetermined alternating rotary movements to unidirectional linear movements.

The details of the mechanism and of locks embodying it may be varied substantially without departing from the spirit of the invention and the exclusive use of all such modifications as some within the scope of the appended claims is contemplated.

I claim:

1. Mechanism for converting predetermined alternating rotational movement to rectilinear movement comprising a translatable non-rotatable element and a rotatable non-translatable element, said rotatable element having a cylindrical surface formed with a groove system, said translatable element having a follower projecting radially into said groove system and having a first position at one end thereof, said groove system comprising a plurality of axially spaced annular grooves and first oblique grooves respectively intersecting adjacent annular grooves, whereby translational movement of said translatable element in one direction away from said first position is achieved by alternate rotational movements of said rotatable element in opposite directions in accordance with the rotational positions of the intersections between said annular and said first oblique grooves, the intersections between said annular and said first oblique grooves being formed to permit only movements in an axial direction away from said first position of said follower from said annular grooves into said first oblique grooves and from said first oblique grooves into said annular grooves, and additional oblique grooves connecting adjacent annular grooves and each extending therebetween in the same rotational direction, the intersections of said additional oblique grooves and said annular grooves being formed to cause said follower to move in a direction axially of said rotatable element toward said first position whereby rotation of said rotatable element in a predetermined single direction causes said follower to return to its first position in said groove system and thereby restore said translatable member to its first position.

2. Mechanism according to claim 1, wherein the intersections between said annular and said first oblique grooves are small acute angles whereby to facilitate passage of said follower therethrough.

3. Mechanism according to claim 1, wherein said grooves have spaced sides and a floor, said follower is maintained in engagement with said floor, and each intersection between an annular groove and a first oblique groove includes a drop-off from the floor of the respective annular groove to the floor of the following first oblique groove and from the floor of the respective first oblique groove to the floor of the following annular groove in a direction axially of the grooved element away from the first position of said follower, whereby said follower drops from the upper floor level to the lower floor level at the respective intersections when said rotatable member is rotated in the proper direction thereat, said follower thereby being moved axially of said rotatable member away from said first position.

4. Mechanism according to claim 3, wherein each intersection between the annular grooves, and the additional oblique grooves, includes a drop-off from the floor of the respective annular groove to the floor of the following additional oblique groove and from the floor of the respective additional oblique groove to the floor of the following annular groove in a direction axially of the rotatable element toward the first position of said follower, whereby said follower drops from the upper floor level to the lower floor level at the respective intersections when the rotatable member is rotated in a predetermined single direction, said follower thereby being moved axially of said rotatable element toward said first position.

5. Mechanism according to claim 3 including means resiliently biasing said follower against the floor of said groove system.

6. Mechanism according to claim 1, wherein the groove nearest one end of said rotatable element is the first annular groove, the intersection between said first annular groove and the first of said first-named oblique grooves being formed to permit passage of said follower from said first annular groove to the portion of the first of said first-named oblique grooves divergent from said first annular groove only when rotation of said rotatable element is properly reversed at said last-named intersection and to prevent such passage of said follower when said rotatable element is rotated continuously in either direction whereby to prevent movement of said follower and said axially movable element away from said first position.

7. Mechanism according to claim 6, wherein one of said additional oblique grooves intersects said first annular groove, there being a drop-off from the floor of said one additional oblique groove to the floor of said first annular groove to prevent passage of said follower from said first annular groove into said one additional oblique groove, irrespective of the direction of rotation of said rotatable member, 8. Mechanism according to claim 7 including a second annular groove adjacent said first annular groove, said first of said first-named oblique grooves intersecting said second annular groove, the intersection between said first of said first-named oblique grooves and said second annular groove having a vertical drop-off from said first of said first-named oblique grooves to said second annular groove to prevent said follower from passing from said second annular groove into said first of said first-named oblique grooves.

9. Mechanism according to claim 8, wherein said one additional oblique groove forms an oblique end portion of said second annular groove.

10. Mechanism according to claim 9, including a second of said first-named oblique grooves intersecting said second annular groove and extending generally parallel to said first of said first-named oblique grooves, a drop-off from said second annular groove to said second of said first-named oblique grooves, a third annular groove, said second of said first-named oblique grooves intersecting said third annular groove and having a drop-off into said third annular groove, said third annular groove having an oblique portion spaced in the same rotational direction as the inclination of said second of said first-named oblique grooves from the last-mentioned drop-off and inclined in an opposite rotational direction axially of the grooves element and intersecting said second annular groove and there having a drop-off into said second annular groove.

11. Mechanism according to claim 10, wherein said second of said first-named oblique grooves intersects said oblique portion of said second annular groove and is formed with a drop-off at said intersection from said second of said first-named oblique grooves into said oblique portion of said second annular groove.

12. Mechanism according to claim 11 including a final circumferential groove intersecting a previous groove, said circumferential groove having a drop-off into said previous groove positioned such that when the rotatable element is rotated in one direction, said follower remains in said circumferential groove and when rotation is reversed passes from said circumferential groove into and through the previous groove, thereby moving said translatable member toward its first position.

13. Mechanism according to claim 12, wherein said final circumferential groove is of sinusoidal shape, one of said annular grooves intermediate said first annular groove and said sinusoidal groove having an oblique end portion tangentially intersecting said sinusoidal groove.

14. Mechanism according to claim 12, wherein said final circumferential groove is of annular shape.

15. A combination lock comprising a casing having an elongated recess, a bolt element slidably mounted in said casing for axial movement therein between a retracted unlocked position and a projected locking position, means holding said bolt element against rotation within said casing, a rotatable element held against axial movement relative to said casing and having a cylindrical surface formed with a groove system comprising a plurality of axially spaced annular grooves and oblique grooves intersecting adjacent annular grooves at positions angularly disposed about the axis of said rotatable element, said bolt element mounting a radially projecting follower slidably fitting into said groove system, and means for selectively rotating said rotatable element alternately in opposite directions in accordance with the intersections of said annular and said first oblique grooves whereby to cause said follower in cooperation with said grooves to move said bolt element axially from projected toward retracted position with respect to said casing, the intersections between said annular and said first oblique grooves being formed to permit movements only in bolt-retracting axial direction of said follower from said annular grooves into said first oblique grooves and from said first oblique grooves into said annular grooves, additional oblique grooves connecting adjacent annular grooves and each extending therebetween in the same rotational direction, the intersections of said additional oblique grooves and said annular grooves being so formed and located to cause said follower to move in a bolt-projecting direction axially of said grooved element when said rotatable element is rotated in a predetermined single direction whereby continuous rotation of said rotatable element in said predetermined single direction causes full projection of said bolt to locking position.

16. A combination lock according to claim 15, wherein said rotatable element is a cam and said groove system is formed in the external cylindrical surface thereof, said follower being carried by said bolt element.

17. A combination lock according to claim 16, wherein said grooves are so arranged that when said bolt element is retracted constant rotation of said cam in a predetermined direction will move said bolt from retracted to locked position.

18. A combination lock according to claim 17, wherein said cam has an annular groove positioned to receive said follower when said bolt element is in the locked position whereby continued rotation of said cam in either direction after said bolt is in fully locked position will maintain said bolt element in said fully locked position.

19. A combination lock according to claim 16, including right angle drive means operatively connected to said cam and means for manually operating said right angle drive means.

20. A combination lock according to claim 19, wherein said right angle drive means includes a shaft on said cam coaxial therewith and extending inwardly of the casing therefrom, a bevel gear mounted on the end of said shaft, and a second shaft at right angles to said cam shaft and mounting a second bevel gear in meshed relation with said first-named bevel gear for rotating said cam in accordance with rotation of said second shaft.

21. A combination lock according to claim 20, wherein said casing is adapted for reception in a bore in lockable structure, said casing having a transverse bore axially aligned with said second bevel gear and adapted for alignment with a transverse bore in the lockable structure, said second shaft extending through said transverse bore in said casing and adapted to extend through the transverse bore in the lockable structure, said second shaft thus being adapted to retain said casing in the first-named bore.

22. A combination lock according to claim 21, wherein said second shaft is removably received in said transverse bores and said second bevel gear, and said second shaft is so constructed as to permit said second shaft to enter said second bevel gear in a single rotational position.

23. A combination lock according to claim 20, wherein said second shaft mounts a knob and dial for manual operation of the lock.

24. A combination lock according to claim 16 including an element rotatably mounted in said casing inwardly of said cam and mounting at its end remote from said bolt element an operating knob and dial, said cam being connected to said rotatably mounted element for rotation therewith whereby said cam is rotatable to move said bolt element between projected and retracted positions.

25. A combination lock according to claim 24, wherein said rotatably mounted element comprises a key-operated lock mechanism having an axially movable member retractable responsive to operation of a key, said axially movable member being connected to said cam whereby upon operation of the key said cam, and with it said bolt element, can be retracted without setting the combination.

26. A combination lock according to claim 25 including spring means biasing said axially movable member in a retracting direction.

27. A combination lock according to claim 26, wherein said rotatably mounted element comprises a tumbler lock cylinder and said axially movable member comprises a tumbler lock plug rotatably and axially movably received in said cylinder, said cylinder being formed with an L-shaped slot having an annular leg and an axial leg, said plug having a radially projecting element extending into said slot and normally seated in the blind end of said annular leg when the key is in locking position and being rotatable into alignment with the axial leg by operation of the key whereby said spring is permitted to urge said plug rearwardly and thereby through its connection with said cam pulling said cam and with it said bolt element rearwardly to retracted position.

28. A combination lock according to claim 16 in which said casing has an inner removable liner and an inwardly projecting element of less depth than the thickness of said liner, said liner having a partly annular groove receiving said inwardly projecting element when said liner is fully inserted in said casing, the outer portion of said liner being cut away from said groove to the adjacent end of the liner to permit passage of said liner into fully inserted position and registry of said inwardly projecting member with said groove, said liner being rotatable to move said inwardly projecting member out of registry with the cut-away portion of said liner and thereby lock said liner in said casing.

29. A combination lock according to claim 15, wherein said grooves have spaced sides and a floor, said follower is maintained in engagement with said floor, and each intersection between an annular groove and a first oblique groove includes a drop-off from the floor of the respective annular groove to the floor of the following first oblique groove and from the floor of the respective first oblique groove to the floor of the following annular groove in a direction toward the bolt-retracting position of said follower, whereby said follower drops from the upper floor level to the lower floor level at the respective intersections when said rotatable member is rotated in the proper direction thereat, said follower thereby being moved axially of said rotatable member toward bolt-retracting position.

30. A combination lock according to claim 29, wherein each intersection between the annular groove and the additional oblique grooves includes a drop-off from the floor of the respective annular groove to the floor of the following additional oblique groove and from the floor of the respective additional oblique groove to the floor of the following annular groove in a direction axially of the rotatable element toward bolt-projecting position of said follower, whereby said follower drops from the upper floor level to the lower floor level at the respective intersections when the rotatable member is rotated in a predetermined single direction, said follower thereby being moved axially of said rotatable element toward bolt-projecting position.

31. A combination lock according to claim 15, wherein the groove nearest one end of said rotatable element is the first annular groove, the intersection between said first annular groove and the first of said first oblique grooves being formed to permit passage of said follower from said first annular groove to the portion of the first of said first oblique grooves divergent from said first annular groove only when rotation of said rotatable element is reversed at said last-named intersection and to prevent such passage of said follower when said rotatable element is rotated continuously in either direction whereby to prevent movement of said follower and said bolt away from projected position.

32. A combination lock according to claim 31, wherein one of said additional oblique grooves intersects said first annular groove, there being a drop-off from the floor of said one additional oblique groove to the floor of said first annular groove to prevent passage of said follower from said first annular groove into said one additional oblique groove irrespective of the direction of rotation of said rotatable member.

33. A combination lock according to claim 32, including a second annular groove adjacent said first annular groove, said first of said first oblique grooves intersecting said second annular groove, the intersection between said first of said first oblique grooves and said second annular groove having a vertical drop-off from said first of said first oblique grooves to said second annular groove to prevent said follower from passing from said second annular groove into said first of said first-named oblique grooves.

34. A combination lock according to claim 33, wherein said one additional oblique groove forms an oblique end portion of said second annular groove.

35. A combination lock according to claim 34, including a second of said first oblique grooves intersecting said second annular groove and extending generally parallel to said first of said first-named oblique grooves, a drop-off from said second annular groove to said second of said first oblique grooves, a third annular groove, said second of said first oblique grooves intersecting said third annular groove and having a drop-off into said third annular groove, said third annular groove having an oblique portion spaced in the same rotational direction as the inclination of said second of said first oblique groove from the last-mentioned drop-off and inclined in an opposite rotational direction axially of the rotatable element and intersecting said second annular groove and having a drop-off into said second annular groove.

36. A combination lock according to claim 35, wherein said second of said first oblique grooves intersects said oblique portion of said second annular groove and is formed with a drop-off at said intersection from said second of said first oblique grooves into said oblique portion of said second annular groove.

37. A combination lock according to claim 36, including a final circumferential groove intersecting a previous groove, said circumferential groove having a drop-off into said previous groove positioned such that when the rotatable element is rotated in one direction said follower remains in said circumferential groove and when rotation is reversed passed from said circumferential groove into and through the previous groove, thereby moving said bolt toward locked position.

38. A combination lock according to claim 37, wherein said final circumferential groove is of sinusoidal shape, one of said annular grooves intermediate said first annular groove and said sinusoidal groove having an oblique end portion tangentially intersecting said sinusoidal groove.

39. A combination lock according to claim 37, wherein said final circumferential groove is of annular shape.

* * * * *